United States Patent [19]

Simms

[11] 4,206,108
[45] Jun. 3, 1980

[54] ACRYLIC GRAFT COPOLYMERS AND COATING COMPOSITIONS THEREOF

[75] Inventor: John A. Simms, Wilmington, Del.

[73] Assignee: E. I. Du Pont de Nemours and Company, Wilmington, Del.

[21] Appl. No.: 972,426

[22] Filed: Dec. 22, 1978

Related U.S. Application Data

[62] Division of Ser. No. 820,879, Aug. 1, 1977, Pat. No. 4,151,227.

[51] Int. Cl.$^2$ .................. C08L 33/14; C08L 33/10; C08L 33/08
[52] U.S. Cl. .................. 260/31.2 N; 260/17 R; 260/29.6 RW; 260/32.8 N; 260/33.6 UA; 525/69; 525/126; 428/500; 428/502; 428/515; 428/516; 428/519
[58] Field of Search .................. 260/885, 901, 31.2 N, 260/32.8 N, 33.6 UA

[56] References Cited

U.S. PATENT DOCUMENTS

| 3,028,367 | 4/1962 | O'Brien | 526/16 |
| 3,245,941 | 4/1966 | Mayer et al. | 260/31.6 |
| 4,016,332 | 4/1977 | Anderson et al. | 428/500 |

*Primary Examiner*—Carman J. Seccuro

[57] ABSTRACT

A graft copolymer having a polymeric backbone with pendent hydroxyl groups; wherein the hydrogen atom of at least the one the hydroxyl groups is replaced by the formula

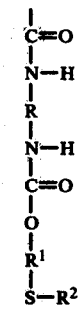

where R is an aliphatic group, a cycloaliphatic group or an aromatic group; $R^1$ is an alkylene group having 2-6 carbon atoms; $R^2$ is a polymer segment of a vinyl addition polymer, such as butyl acrylate/hydroxyethyl acrylate; coating compositions of this copolymer can be cross-linked with conventional cross-linking agents such as an alkylated melamine formaldehyde resin or an organic polyisocyanate and coating compositions useful for flexible elastomeric substrates can be prepared from this copolymer.

9 Claims, No Drawings

ACRYLIC GRAFT COPOLYMERS AND COATING COMPOSITIONS THEREOF

This is a division, of application Ser. No. 820,879, filed Aug. 1, 1977, now U.S. Pat. No. 4,151,227.

BACKGROUND OF THE INVENTION

This invention is related to graft copolymers, a process for making these copolymers and to coating compositions containing these copolymers.

Certain uses for polymers require that the polymer have several particular characteristics; for example, finishes for flexible elastomeric trim parts for modern automobiles and trucks require a film forming polymer with characteristics that provide a flexible finish after the finish is fully cured and that provide a finish that has excellent adhesion, durability and weatherability. Conventional polymerization techniques have been found to be inadequate to form polymers having characteristics such as are required for flexible finishes. The process of this invention forms novel polymers having these characteristics for flexible finishes and for other finishes and can be used to form polymers for other uses.

SUMMARY OF THE INVENTION

A graft copolymer having a polymeric backbone with pendent hydroxyl groups, wherein the hydrogen atom of at least one of the hydroxyl groups is replaced by the following formula:

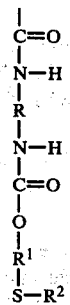

where R is an aliphatic group, a cycloaliphatic group or an aromatic group; $R^1$ is an alkylene group having 2–6 carbon atoms, $R^2$, which forms a side chain of the graft copolymer, is a polymer segment of a vinyl addition polymer.

Coating compositions of this copolymer and a process for making this copolymer are also part of this invention.

DESCRIPTION OF THE PREFERRED EMBODIMENTS

The graft copolymer has a polymeric backbone and at least one polymeric side chain pending from the backbone. A mercapto organic isocyanate is used to link the backbone with the side chain. By varying the composition of the backbone and side chain(s), graft copolymers can be designed for a wide variety of uses. In particular, the graft copolymer can be used as a film forming constituent in coating compositions. For example, flexible coating compositions which have excellent adherence to nonmetallic substrates and are flexible and durable now can be made using the graft copolymers as the film forming constituent or as one of the film forming constituents.

By using selected monomers in the backbone and side chain(s) of the graft copolymer, solution coating compositions, aqueous coating compositions or organosol coating compositions can be formed. For solution coating composition, a graft copolymer is used in which both the backbone and side chain(s) are soluble in the solvent used for the coating composition. In an organosol coating composition, either the backbone or preferably the side chain(s) of the graft copolymer is soluble in the solvent used in the coating composition. In an aqueous coating composition, hydroxy and carboxyl groups from either the backbone or side chain(s) or both can be used to solubilize or disperse the copolymer. Generally, in an aqueous coating composition, ammonia or an amine is used to form a salt of the copolymer which readily disperses in water.

In one method for preparing the graft copolymer, a mercapto organic isocyanate is reacted at about 80°–150° C. for about 0.5–6 hours, with usually a conventional catalyst, with ethylenically unsaturated monomers which polymerize by vinyl addition reaction to form an isocyanate terminated polymer. A polymer containing pendent hydroxy groups is prepared and the isocyanate terminated polymer is reacted with pendent hydroxyl groups of hydroxyl containing polymer to form the graft copolymer. The polymer containing pendent hydroxyl groups forms the backbone of the graft copolymer and the isocyanate terminated polymer forms the side chain(s) of the graft copolymer In the preferred method for preparing the graft copolymer, the mercapto organic isocyanate is added to a hydroxyl containing polymer usually in the presence of a catalyst to form a polymer with reactive mercapto groups. The reaction is carried out at about 80°–150° C. for about 0.5–6 hours. Typical catalysts that can be used are stannous acetate, butyl tin oxide or dibutyl tin dilaurate. This polymer containing reactive mercapto groups is reacted with ethylenically unsaturated monomers which polymerize by vinyl addition polymerization to form the graft copolymer. The reaction is carried out at about 60°–150° C. for about 1–6 hours and usually a catalyst is used. Typical catalysts are used at about 0.1–4% by weight of the polymerizable constituents used to prepare the graft copolymer and are for example, azobisisobutyronitrile azobisdimethyl valeronitrile, benzoyl peroxide, tertiary butyl peroxy pervalate. Up to 5 percent by weight of a chain transfer agent such as dodecyl mercapton or benzene thiol can be used to control the molecular weight of the graft copolymer.

The graft copolymer has a weight average molecular weight of about 5,000 to 1,000,000 determined by gel permeation chromatography. The graft copolymer contains about 25–95% by weight of backbone and about 5–75% by weight of side chain(s). Preferably, the graft copolymer contains about 50–90% by weight of backbone and about 10–50% by weight of side chain(s).

The mercapto organic isocyanate is prepared by reacting one mole of mercapto alkanol with one mole of an organic diisocyanate at about 50°–120° C. for about 20 to 240 minutes. Usually a solvent such as toluene, xylene, ethyl acetate, butyl acetate or the like is used. Also, a catalyst such as p. toluene sulfonic acid, butyl acid phosphate, acetic acid is used. To determine when the mercapto organic isocyanate has been formed, an infrared spectrophotometer can be used to measure the amount of unreacted hydroxyl and isocyanate group in a sample. Generally, when the absorbence ratio of carbonyl to isocyanate reaches about 0.5, the reaction is complete and the mercapto organic isocyanate has been formed. The resulting mercapto organic isocyanate has the formula

where R is an aliphatic, cycloaliphatic or aromatic group and $R^1$ is an alkylene group having 2–6 carbon atoms.

Typical mercapto alkanols that can be used have 2–6 carbon atoms and are as follows: 1,2-mercaptoethanol, 1,2 and 1,3 mercaptopropanol, mercaptoisopropanol, 1,4-mercaptobutanol, mercaptoisobutanol, 1,5 mercaptopentanol, 1,6-mercaptohexanol and the like.

Typical organic diisocyanates that can be used are as follows: isophorone diisocyanate which is 3-isocyanate-methyl-3,5,5-trimethyl-cyclohexyl-isocyanate,
propylene-1,2-diisocyanate,
butylene-1,2-diisocyanate,
butylene-1,3-diisocyanate,
methyl-2,6-diisocyanato caproate,
hexamethylene diisocyanate,
2,4,4-trimethylhexamethylene diisocyanate
octamethylene diisocyanate,
2,2,4-trimethylhexamethylene diisocyanate
nonamethylene diisocyanate,
decamethylene diisocyanate,
2,11-diisocyano-dodecane and the like,
meta-phenylene diisocyanate,
para-phenylene diisocyanate,
toluene-2,4-diisocyanate,
toluene-2,6-diisocyanate,
xylene-2,4-diisocyanate,
xylene-2,6-diisocyanate,
dialkyl benzene diisocyanates, such as methylpropylbenzene diisocyanate, methylethylbenzene diisocyanate, and the like;
2,2'-biphenylene diisocyanate,
3,3'-biphenylene diisocyanate,
4,4'-biphenylene diisocyanate,
3,3'-dimethyl-4,4'-diphenylene diisocyanate, and the like;
methylene-bis-(4-phenyl isocyanate),
ethylene-bis-(4-phenyl isocyanate),
isopropylidene-bis-(4-phenyl isocyanate),
butylene-bis-(4-phenylisocyanate),
hexafluoroisopropylidene-bis-(4-phenyl isocyanate), and the like;
2,2'-oxydiphenyl diisocyanate,
3,3'-oxydiphenyl diisocyanate,
4,4'-oxydiphenyl diisocyanate,
2,2'-ketodiphenyl diisocyanate,
3,3'-ketodiphenyl diisocyanate,
4,4'-ketodiphenyl diisocyanate,
2,2'-thiodiphenyl diisocyanate,
3,3'-thiodiphenyl diisocyanate,
4,4'-thiodiphenyl diisocyanate, and the like;
2,2'-sulfonediphenyl diisocyanate,
3,3'-sulfonediphenyl diisocyanate,
4,4'-sulfonediphenyl diisocyanate, and the like
2,2'-methylene-bis-(cyclohexyl isocyanate),
3,3'-methylene-bis-(cyclohexyl isocyanate),
4,4'-methylene-bis-(cyclohexyl isocyanate),
4,4'-ethylene-bis-(cyclohexyl isocyanate),
4,4'-propylene-bis-(cyclohexyl isocyanate),
bis-(para-isocyano-cyclohexyl)sulfide,
bis-(para-isocyano-cyclohexyl)sulfone,
bis-(para-isocyano-cyclohexyl)ether,
bis-(para-isocyano-cyclohexyl)diethyl silane,
bis-(para-isocyano-cyclohexyl)diphenyl silane,
bis-(para-isocyano-cyclohexyl) ethyl phosphine oxide
bis-(para-isocyano-cyclohexyl)phenyl phosphine oxide
bis-(para-isocyano-cyclohexyl)N-phenyl amine,
bis-(para-isocyano-cyclohexyl)N-methyl amine,
bis-(4-isocyano-phenyl)diethyl silane,
bis-(4-isocyano-phenyl)diphenyl silane,
dichloro-biphenylene diisocyanate,
bis-(4-isocyano-phenyl)ethyl phosphine oxide,
bis-(4-isocyano-phenyl)phenyl phosphine oxide
bis-(4-isocyano-phenyl)-N-phenyl amine,
bis-(4-isocyano-phenyl)-N-methyl amine,
3,3'-dimethyl-4,4'-diisocyano biphenyl,
3,3'-dimethoxy-biphenylene diisocyanate,
2,4-bis-(β-isocyano-t-butyl)toluene,
bis-(para-β-isocyano-t-butyl-phenyl)ether,
para-bis-(2-methyl-4-isocyano-phenyl)benzene,
para-bis-(1,1-dimethyl-5-amino-pentyl)benzene,
3,3'-diisocyano adamantane,
3,3'-diisocyano biadamantane,
3,3'-diisocyanoethyl-1,1'-biadamantane,
1,2-bis-(3-isocyano-propoxy)ethane,
2,2-dimethyl propylene diisocyanate,
3-methoxy-hexamethylene diisocyanate
2,5-dimethyl heptamethylene diisocyanate,
5-methyl-nonamethylene diisocyanate,
1,4-diisocyano-cyclohexane,
1,2-diisocyano-octadecane,
2,5-diisocyano-1,3,4-oxadiazole,
$OCN(CH_2)_3O(CH_2)_2O(CH_2)_3NCO$,
$OCN(CH_2)_3S(CH_2)_3NCO$ and

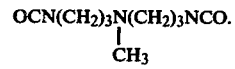

Isophorone diisocyanate is preferred since it reacts rapidly and forms a stable intermediate.

Polymers used for the backbone of the graft copolymer contain functional hydroxyl groups. These polymers can be acrylic polymers, polyesters, styrene/allyl alcohol copolymers, phenoxy resins, epoxy resins such as condensates of epichlorohydrin and bisphenol A, epoxyester polymers, cellulosic polymers such as cellulose acetate butyrate, cellulose acetate propionate, nitro cellulose, partially hydrolyzed polyvinyl acetate, oil free alkyd resins, drying oil alkyd resins, ethylenepropylene oxide polymers and polyalkylene ether glycol.

The polymeric side chains of the graft copolymer can be any of a wide variety of monomers that polymerize by a vinyl addition reaction. Typically useful monomers are as follows: ethylene, propylene, butylene, vinyl chloride, vinylidene chloride, tetrafluoroethylene, trifluorochoroethylene, tetrafluoroethylene/hexafluoropropylene, tetrafluoroethylene/perfluorovinylether, vinyl acetate, styrene, allyl alcohol, styrene/allyl alcohol, alkyl acrylates or methacrylates having 1–18 carbon atoms in the alkyl group, hydroxy alkyl acrylates or methacrylates having 1–12 carbon atoms in the alkyl group, acrylamide, methacrylamide, acrylonitrile, methacrylonitrile, methacrylic acid, acrylic acid, itaconic acid and mixture of the above monomers.

One typically useful graft copolymer prepared according to the process of this invention comprises a graft copolymer in which the backbone is of an alkyl acrylate or methacrylate and a hydroxy alkyl acrylate or methacrylate and in which the side chains are of an alkyl acrylate or methacrylate and a hydroxy alkyl acrylate or methacrylate.

Alkyl acrylates and methacrylates that can be used to prepare this graft copolymer are methyl methacrylate, ethyl methacrylate, propyl methacrylate, isopropyl methacrylate, butyl methacrylate, isobutyl methacrylate, tertiary buty methacrylate, hexyl methacrylate, 2-ethylhexy methacrylate, lauryl methacrylate, ethyl acrylate, propyl acrylate, butyl acrylate, hexyl acrylate, octyl acrylate and the like. Typically useful hydroxy alkyl acrylate and methacrylates are hydroxyethyl acrylate, hydroxypropyl acrylate, hydroxybutyl acrylate, hydroxyethyl methacrylate, hydroxypropyl methacrylate, hydroxybutyl methacrylate and the like. Ethylenically unsaturated carboxylic acids such as acrylic acid and methacrylic acid can also be used.

Typically examples of polymers of this type are as follows:

(1) a graft copolymer having a backbone of methyl methacrylate/2 hydroxy ethyl methacrylate and side chains of butyl acrylate 2-hydroxyethyl acrylate;

(2) a graft copolymer having a backbone of butyl acrylate/hydroxyethyl acrylate and side chains of methyl methacrylate/butyl acrylate/hydroxyethyl acrylate/acrylic acid.

Another useful graft copolymer has a backbone of styrene/allyl alcohol and side chains of an alkyl acrylate or methacrylate. One typical graft copolymer of this type has a backbone of styrene/allyl alcohol and side chains of 2 ethylhexyl acrylate.

One useful water dispersible graft copolymer has a backbone of a styrene/allyl alcohol ester and side chains of an ethylenically unsaturated carboxylic acid. A typical graft copolymer of this type has a backbone of styrene/allyl alcohol esterified with a drying oil fatty acid such as linoleic acid and side chains of polymerized methacrylic acid or acrylic acid.

Another useful graft copolymer has a polyester backbone and side chains of polymerized acrylic monomers. The polyester is of a polyol or a mixture of polyols and a dicarboxylic acid and the side chains can be of any of the aforementioned acrylic monomers.

One useful graft copolymer of this type has a backbone of polyester of neopentyl glycol/trimethylol propane/azelaic acid and side chains of methyl methacrylate/butylacrylate/hydroxyethyl acrylate/acrylic acid.

In another useful graft copolymer, the backbone is a cellulosic polymer having reactive hydroxyl groups and the side chains are any of the aforementioned alkyl acrylates or methacrylates, hydroxy alkyl acrylates or methacrylates or mixtures thereof. One useful graft copolymer of this type has a backbone of cellulose acetate butyrate and side chains of methyl methacrylate/butyl acrylate.

When the graft copolymer is used in coating compositions for flexible substrates, described hereinafter, the graft copolymer should have an elongation at break of at least 15%, preferably, 15-50%.

Conventional solvents can be used to prepare the graft copolymer and to dilute the graft copolymer, or coating compositions prepared from the graft copolymer and are as follows: toluene, xylene, butyl acetate, ethyl acetate, acetone, methyl ethyl ketone, methylisobutyl ketone, and other aromatic hydrocarbons, cycloaliphatic hydrocarbons, esters, ethers, and ketones such as are conventionally used.

Coating compositions prepared with the graft copolymer contain as the film forming constituents about 50-95% by weight of the graft copolymer and about 5-50% by weight of a cross-linking agent. Generally these coating compositions have a solids content of film forming constituent of about 5-60% by weight.

The cross-linking agent used in the coating composition is compatible with the graft copolymer and can either be an alkylated melamine formaldehyde resin or a polyisocyanate. Typical alkylated melamine formaldehyde resins have one to eight carbon atoms in the alkyl group and are resins that are well known in the art. These resins are prepared by conventional techniques in which a lower alkyl alcohol such as methanol, ethanol, butanol, isobutanol, propanol, isopropanol, hexanol, 2-ethyl hexanol and the like is reacted with a melamine formaldehyde to provide pendent alkoxy groups.

Preferred melamine resins that are used are butylated melamine formaldehyde resins, methylated/butylated melamine formaldehyde resins and hexa(methoxymethyl) melamine resin.

An acid catalyst can be used in the coating composition such as para-toluene sulfonic acid or butyl acid phosphate. An acid catalyst is needed if there is an absence of acid groups in the graft copolymer of if a low temperature cure is required or if a highly etherified melamine resin is used such as hexa(methoxymethyl)-melamine.

A variety of organic polyisocyanates can be used as the crosslinking agent in the coating composition and include the aforementioned isocyanates and other aliphatic, cycloaliphatic, heterocyclic polyisocyanates. Typical polyisocyanates are, for example, methylene-bis-(4-cyclohexylisocyanate), tetramethylene diisocyanate, hexamethylene diisocyanate, ethylene diisocyanate, cyclohexylene-1,2-diisocyanate, and the like.

Polyisocyanates of a biuret, for example, the biuret of hexamethylene diisocyanate made according to Mayer et al. U.S. Pat. No. 3,245,941, issued Apr. 12, 1966 can also be used.

Organic plasticizers can also be used in the coating composition in amounts up to 1-10 percent by weight based on the weight of film-forming constituents. Monomeric and polymeric plasticizers can be used such as phthalate ester plasticizers, and in particular, alkyl and cycloalkyl ester phthalates in which the alkyl groups have 2-10 carbon atoms such as dioctyl phthalate, didecyl phthalate, butyl benzylphthalate, dicyclohexyl phthalate and mixtures thereof. Epoxidized soya bean oil, oil free and oil modified alkyds can also be used as plasticizers. Polyester resins such as alkylene glycol esters of adipic and benzoic acid, for example, ethylene glycol adipate benzoate, ethylene glycol adipate benzoate phthalate, can also be used in the coating composition of this invention.

The coating composition can be pigmented. Typical pigments which can be used are metallic oxides, preferably titanium dioxide, zinc oxide, iron oxide, and the like, metallic flakes, such as aluminum flake, metallic powders, metallic hydroxides, "Afflair" pigments, i.e., mica coated with titanium dioxide, sulfates, carbonates, carbon blacks, silica, talc, china clay and other pigments, organic dyes and lakes.

Other compatible resins can be incorporated into the coating composition such as vinyl chloride copolymers, polyurethanes, cellulose acetate butyrate, and silicone resins. Also, ultraviolet light stabilizers can be incorporated into the coating composition.

If the coating composition is formed into a water based finish by using acid constituents in the graft copolymer, the acid constituents are neutralized with ammonia or an amine such as diethylethanol amine and water is added to form the composition. Any of the aforementioned additives, resins, plasticers and pigments can be incorporated into the aqueous composition by using conventional techniques.

A primer composition is usually applied to the substrate before the above coating composition is applied. Any of the conventional alkyd resin, epoxy resin or epoxy ester resin primers can be used. In particular when the coating composition is used over a flexible substrate, a primer of a hydroxyl terminated polyalkylene ether glycol cross-linked with an aromatic diisocyanate or a polyester chain-extended with an organic diisocyanate and cross-linked with an alkylated melamine formaldehyde resin is used.

Preferred primers for flexible substrates are as follows: a hydroxyl terminated polypropylene ether glycol cross-linked with toluene diisocyanate and an isophthalate polyester chain-extended with methylenebis(cycloxyl isocyanate) cross-linked with alkylate melamine formaldehyde resin.

Any of the aforementioned pigments and other additives can be added to the primers. Preferably, carbon black and extender pigments are used in the primer.

The flexible substrate may be any one of the well-known polyvinyl chloride, polyurethanes or unsaturated or saturated hydrocarbon elastomers, e.g., ethylenepropylene copolymer elastomers, particularly one that is made sulfur curable by the inclusion of 1–10 percent by weight nonconjugated diene, because of their better resistance to oxidative and thermal aging. Butyl rubber, styrene-butadiene rubber, polybutadiene rubber or polyisoprene rubber (either natural or synthetic) are also used. Typical ethylene-propylene rubbers are those copolymers containing 50–75 weight percent ethylene, 25–45 weight percent propylene, and 2–8 weight percent non conjugated diene such as 1,4-hexadiene, 5-ethylidene-2-norbornene or dicyclopentadiene.

To prepare a coated article with the coating composition, a primer, if used, is applied by conventional techniques to the substrate by the usual application methods such as spraying, electrostatic spraying, dipping, brushing, flow-coating and the like. The primer is then baked at 95° to 145° C. for 5 to 60 minutes. The coating composition is then applied by one of the aforementioned application methods and baked at 95° to 130° C. for 15 to 60 minutes.

The following Examples illustrate the invention. All quantities are on a weight basis unless otherwise indicated.

EXAMPLE 1

The following constituents are changed into a reaction vessel equipped with a reflux condenser, thermometer and stirrer:

| Portion 1 | |
|---|---|
| Toluene | 100.00 g |
| p Toluene sulfonic acid | 0.01 g |
| 2-Mercaptoethanol | 2.35 g |
| Portion 2 | |
| Isophorone diisocyanate | 6.70 g |
| Total | 109.06 g |

Portion 1 is changed into the reaction vessel and dried azeotropically by heating Portion 1 to its reflux temperature for 75 minutes. Portion 2 is added and the resulting reaction mixture is held at about 100° C. A sample is removed after about 1.5 hours and analyzed on an infrared spectrophotometer to determine the carbonyl to isocyanate absorbance ratio. The reaction mixture is held at 100° C. until the carbonyl to isocyanate ratio of a sample reaches about 0.50.

The resulting mercapto isocyanate solution has a 8.25% by weight solids content.

Graft Copolymer Synthesis

The following constituents are changed into a reaction vessel equipped with a reflux condenser, a stirrer and thermometer:

| Portion 1 | |
|---|---|
| Copolymer solution (47% solids | 188.00 g | of a methyl methacrylate/2-hydroxy ethyl methacrylate copolymer 85/15 ratio, having an inherent viscosity of 0.429 measured at 0.5% solids in dichloroethylene, and the solvent is a 70/30 mixture of toluene/ethyl acetate)

| | |
|---|---|
| Stannous octoate | 0.01 cc |
| Mercapto isocyanate solution (prepared above) | 7.76 g |
| Portion 2 | |
| Butyl acrylate | 90.00 g |
| 2-Hydroxyethylacrylate | 10.00 g |
| Portion 3 | |
| Azobisisobutyronitrile | 0.35 g |
| Toluene | 25.00 g |

Portion 1 is charged into the reaction vessel and heated for about 6 hours. No isocyanate groups are observed in a sample analyzed by an infrared spectrophotometer. Portion 2 is charged into the reaction vessel and then Portion 3 is charged into the vessel at the rate of 5 g every 30 minutes until Portion 3 is depleted while holding the resulting reaction mixture at its reflux temperature. After the addition of Portion 3, the reaction mixture is held at its reflux temperature for an additional 30 minutes.

The resulting composition has a polymer solids content of about 53% and the polymer is of 66 parts of methyl methacrylate/2-hydroxy ethylacrylate (90/10 ratio) and 33 parts of butyl acrylate/2-hydroxyethyl acrylate (90/10 ratio) and has an inherent viscosity measured as above of 0.78 and a weight average molecular weight determined by gel permeation chromatography of about 200,000.

About 37.6 parts of the polymer solution is blended with about 37.6 parts of the polymer solution is blended with about 6.4 parts of a 75% by weight the biruet of hexamethylene diisocyanate in acetone solvent to form a coating composition. This coating composition is sprayed onto a primed metal substrate and baked at 120 C for 30 minutes. The resulting finish has a hardness of 7.8 knoops.

A film of the coating composition is drawn down on a glass plate, baked as above and removed and the following physical properties are measured on an Instron Tensil Testing Machine:

| % Elongation at break (measured at 25° C.) | 15 |
|---|---|
| Tensile Strength | 4500 pounds per square inch (psi) |
| Initial Modulus | 130,000 psi. |

EXAMPLE 2

The following constituents are changed into a reaction vessel equipped as in Example 1 to form a mercapto terminated copolymer solution:

| Copolymer solution (54.0% solids of a butyl acrylate/hydroxy hydroxyethyl acrylate (BA/HEA), weight ratio 93/7 having a inherent viscosity of 0.25 measured as in Example 1, in toluene) | 185 g |
|---|---|
| Dibutyl tin dilaurate | 0.10 g |
| Mercapto isocyanate solution (prepared in Example 1) | 109.00 g |

The above mixture is heated for 6 hours at 110° C. A sample of the mixture is removed and analyzed on an infrared spectrophotometer. No isocyanate absorption was observed on the infrared spectra which indicates that the isocyanate groups have reacted with the hydroxyl groups of the copolymer.

A monomer mixture is prepared by blending the following monomers:

| methyl methacrylate (MMA) | 52 g. |
|---|---|
| butyl acrylate (BA) | 29 g. |
| hydroxyethyl acrylate (HEA) | 13 g. |
| acrylic acid (AA) | 6 g. |

Sixty grams of the above monomer mixture are added to the above prepared mercapto terminated copolymer solution and the resulting reaction mixture is heated to its reflux temperature. The remainder of monomer mixture is blended with 0.40 grams of azobisisobutyronitrile and 20 grams of toluene and this mixture is slowly added to the above reaction mixture over a 3 hour period while maintaining the reaction mixture at its reflux temperature. About 1 hour, 2 hours and 2.5 hours after the reaction mixture is heated to its reflux temperature, 50 gram portions of n-butanol are added to reduce the viscosisty of the solution. At the end of the reaction, a final portion of 150 g of butanol is added to cool the reaction mixture. The resulting graft copolymer solution has a solids content of 27.6%. The resulting graft copolymer has a inherent viscosity of 0.73 measured as in Example 1. The graft copolymer solution is clear and provides a clear film 2 mil thick film on glass when baked at 120° C. for 30 minutes.

The graft copolymer has a calculated compositive of 33.1% BA/HEA(93/7), 5.5% mercaptoisocyanate 61.4% MMA/BA/HEA/AA(52/29/13/6) and has a weight average molecular weight of about 200,000 determined by gel permeation chromatography.

Butylated melamine formaldehyde solution is blended with the above graft copolymer solution to provide a coating composition in which the ratio of graft copolymer to butylate melamine formaldehyde is 87/13. The coating composition is sprayed onto a primed metal substrate and baked at 120° C. for 40 minutes. The resulting finish has a hardness of about 2.1 knoops.

A film of the above coating composition is cast on a glass substrate and baked as above and removed and its physical properties are measured on an Instron Tensile Testing Machine at different temperatures. The results are as follows:

| Test Temperature | % Elongation at Break | Tensile Strength (psi) | Initial Modulus (psi) |
|---|---|---|---|
| 65° C. | 17 | 281 | 2200 |
| 23° C. | 36 | 1100 | 6200 |
| −18° C. | 15 | 1800 | 21,000 |
| −28° C. | 8 | 2200 | 55,000 |

EXAMPLE 3

A graft copolymer having a styrene/allyl alcohol backbone and poly 2-ethylhexylacrylate can be prepared by changing the following constituents into a polymerization vessel equipped as in Example 1:

| Styrene/allyl alcohol copolymer solution (50% solids in which the copolymer has a number average molecular weight of 1600, a weight average molecular weight 2340, both determined by gel permeation chromotography, 5.7% hydroxyl content and a ratio of 5.3 moles of allyl alcohol to 12.3 moles of styrene) | 80 g |
|---|---|
| Mercapto isocyanate solution (prepared in Example 1) | 100 g |
| Dibutyltin dilaurate | 0.1 g |

The above mixture should be heated for about 3 hours at about 110° C. and a mercapto functional styrene/allyl alcohol copolymer should result.

To the above prepared mercapto functional styrene/allyl alcohol copolymer solution, a mixture of about 0.1 g of azobisisobutyronitrile and 20 g of 2ethylhexyl acrylate should be added at a uniform rate over a 3 hour period while maintaining the resulting reaction mixture at about 95°-100° C. The reaction should be continued for an additional 30 minutes to form a graft copolymer having a backbone of styrene/allyl alcohol and side chains of poly 2-ethylhexyl acrylate.

The resulting graft copolymer solution can be converted into a stable organosol by the addition of heptane. Butylated melamine resin can be added to both the organosol of the graft copolymer of solution of the graft copolymer to form a coating composition that can be baked at moderate temperatures to a hard glossy chemically resistant finish.

EXAMPLE 4

A water dispersible styrene/allyl alcohol ester graft copolymer having methacrylic acid side chains can be prepared by charging the following constituents into a reaction vessel equipped as in Example 1.

| Portion 1 | |
|---|---|
| Styrene allyl alcohol copolymer solution (described in Example 3) | 100 g |
| Linoleic Acid | 56 g |
| Xylene | 50 g |
| Portion 2 | |
| Mercapto isocyanate solution (prepared in Example 1) | 60 g |
| Dibutyltin dilaurate | 0.01 g |

Portion 1 should be heated to its reflux temperature and reacted until the acid number of the mixture is about 5 milligrams KOH per gram of sample. Portion 2 should then be added and the reaction mixture should be heated to about 110° C. and held at this temperature for about 3 hours.

A graft copolymer can be prepared by adding methacrylic acid monomer to the above prepared reaction mixture along with a catalyst of azobisisobutyronitrile and then reacting the constituents at about 90° C. for about 2 hours to provide a graft copolymer with an acid number of about 30.

The resulting graft copolymer should be neutralized with dimethylethanol amine and then water can be added to form a dispersion. The resulting dispersion should be stable even when stored for an extended period at 60° C.

A useful coating composition can be prepared from this dispersion by the addition of a sufficient amount of a conventional cobalt dryer. Films from this coating compostion should dry in about 24 hours to a hard, glossy, durable and weatherable finish.

EXAMPLE 5

A polyester graft copolymer having acrylic side chains can be prepared by charging the following constituents into a reaction vessel equipped as in Example 1.

| Neopentyl glycol | 1248 g |
|---|---|
| Trimethylol propane | 295 g |
| Azelaic acid | 2331 g |

The above mixture of constituents should be heated to and held at about 230° C. while removing water from the mixture until a polyester is formed having an acid number of about 7.

About 50 grams of the mercaptoisocyanate solution prepared in Example 1 along with 0.01 g of dibutyltin dilaurate should be added to about 40 grams of the above prepared polyester and heated for about 3 hours at 100° C. to form a polyester having reactive mercapto groups.

A graft copolymer then can be prepared by adding the above polyester with reactive mercapto groups to the following mixture of acrylic monomers and catalysts over a 3 hour period while holding the resulting reaction mixture at about 100°–105° C. The mixture of acrylic monomers and catalyst is as follows:

| Methyl methacrylate | 30 g |
|---|---|
| Butyl acrylate | 15 g |
| Hydroxyethyl acrylate | 15 g |
| Acrylic Acid | 1 g |

| -continued | |
|---|---|
| Azobisisobutyronitrile | 0.3 g |

The resulting polyester graft copolymer having acrylic side chains can be formed into a coating composition with a methylated melamine crosslinking resin which can be applied and baked as in Example 1 to form a durable flexible finish. These finishes can be used over flexible hydrocarbon rubber or polyvinyl chloride substrates with appropriate primers to provide finishes of excellent flexibility and toughness.

EXAMPLE 6

A cellulose acetate butyrate graft copolymer having acrylic side chains can be prepared by using the reaction vessel equipped as in Example 1. A solution of 40 g of cellulose acetate butyrate having a 2% acetyl content, a 53% butyryl content, a 1.6% hydroxyl content and a 0.2 second viscosity measured according to ASTMD-817-65 is charged into the reaction vessel. A sufficient amount of the mercapto isocyanate solution prepared in Example 1 should be added to react with the hydroxyl groups of the cellulose acetate butyrate along with about 0.01 g of dibutyltin dilaurate. The above constituent should be reacted for about 3 hours at about 110° C. to form a cellulose acetate butyrate polymer having reactive mercapto groups.

A graft copolymer then can be prepared by adding the following mixture to the above cellulose acetate butyrate polymer having reactive mercapto groups over a 3 hour period while holding the reaction temperature at about 100°–105° C.

| Methyl methacrylate monomer | 40 g |
|---|---|
| Butyl acrylate monomer | 20 g |
| Azobisisobutyronitrile | 0.3 g |

The reaction should be continued for an additional 30 minutes after the above monomer mixture is added. The resulting graft copolymer should have acrylic side chains and a cellulose acetate butyrate backbone.

The resulting graft copolymer can be used in coating compositions with or without conventional crosslinking agents. A lacquer of the graft copolymer can be prepared which forms a high quality tough and transparent finish for wood.

[Note: Examples 3–6 were not conducted in a laboratory but one skilled in the art should obtain the compositions as set forth therein.]

I claim:

1. A coating composition comprising 5–60% by weight of a film forming constituent of a graft copolymer and 50–95% by weight of a liquid, wherein the graft copolymer consisting essentially of about 25–95% by weight of an acrylic polymer backbone and about 5–75% by weight of side chains; wherein the acrylic polymer backbone contains pendent hydroxyl groups before the attachment of side chains by replacement of a hydrogen of at least one of the hydroxyl groups by the formula

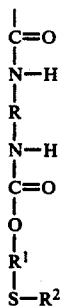

where R is an aliphatic group, a cycloaliphatic group or an aromatic group; $R^1$ is an alkylene group having 2–6 carbon atoms, $R^2$, which forms a side chain, is a polymer segment of an acrylic polymer.

2. The coating composition of claim 1 in which the graft copolymer has a weight average molecular weight of about 5,000 to 1,000,000 determined by gel permeation chromatography.

3. The coating composition of claim 3, wherein the film forming constituents consist essentially of
   (a) 50–95% by weight of the graft copolymer and
   (b) 5–50% by weight of a crosslinking agent.

4. The coating composition of claim 3 in which the crosslinking agent is an alkylated melamine formaldehyde resin.

5. The coating composition of claim 3 in which the crosslinking agent is an organic polyisocyanate.

6. The coating composition of claim 2 in which the backbone of the graft copolymer is of polymerized monomers selected from the group consisting of alkyl methacrylate, alkyl acrylate, hydroxy alkyl acrylate, hydroxy alkyl methacrylate and mixtures thereof.

7. The coating composition of claim 6 in which $R^2$ is of polymerized monomers selected from the group consisting of alkyl acrylate, hydroxyl alkyl acrylates, hydroxy alkyl methacrylates and mixtures thereof.

8. The coating composition of claims 4 or 5 in which the graft copolymer has a backbone consisting essentially of polymerized methyl methacrylate, 2-hydroxy ethyl methacrylate and $R^2$ consists essentially of polymerized butyl acrylate and hydroxy ethyl acrylate and in which R is cyclohexylene and $R^1$ is $+CH_2+_2$.

9. The coating composition of claims 4 or 5 in which the graft copolymer has a backbone consisting essentially of polymerized butyl acrylate and hydroxy ethyl acrylate and $R^2$ consists essentially of polymerized methyl methacrylate, butyl acrylate, hydroxy ethyl acrylate and acrylic acid and in which R is cyclohexylene and $R^1$ is $+CH_2+_2$.

* * * * *